United States Patent Office 3,034,798
Patented May 15, 1962

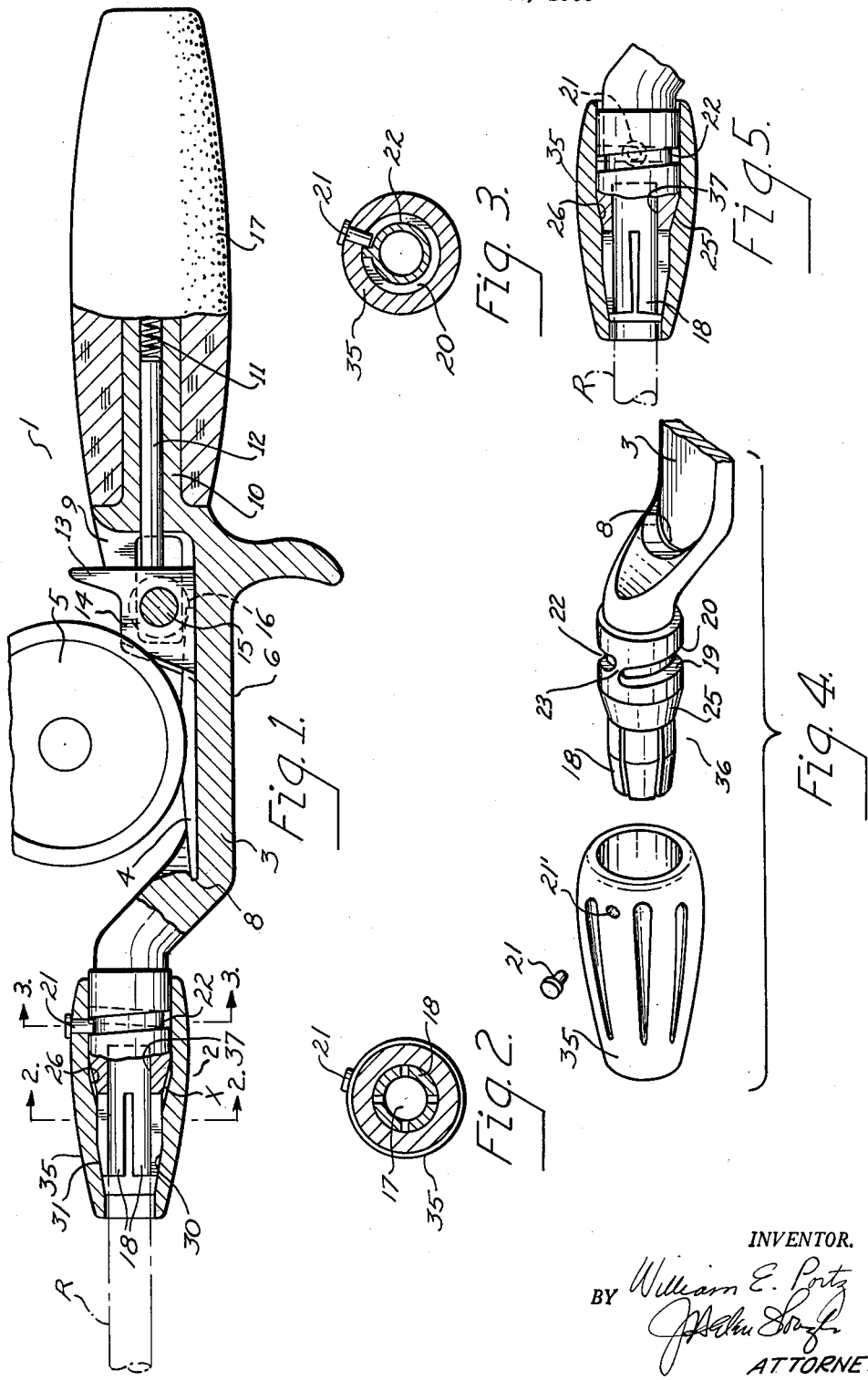

3,034,798
FISHING ROD HANDLES
William E. Portz, Geneva, Ohio, assignor to True Temper Corporation, Cleveland, Ohio, a corporation of Ohio
Filed Mar. 22, 1960, Ser. No. 16,764
8 Claims. (Cl. 279—42)

This invention relates to fishing rod handles and relates more particularly to improved means for detachably mounting fishing rods thereto.

It is an object of this invention to provide improved means for securing a conventional type rod to a fishing rod handle which will be simple in construction, inexpensive to manufacture and highly efficient in use.

Another object of this invention is to provide improved means for locking the conventional type rod to a handle therefor.

Another object of this invention is to provide improved means for locking a fishing rod to a fishing rod handle which will accommodate various size rods.

A further object of this invention is to provide improved means for rapidly and securely mounting a rod on a fishing rod handle.

A still further object of this invention is to provide improved means for rapidly unlocking and detaching the rod from its associated handle.

Other objects of this invention and the invention itself will become more readily apparent by reference to the following description and appended drawing, in which drawing:

FIG. 1 is a generally longitudinally medial sectional view of the assembled fishing rod handle embodying this invention, certain parts being shown in elevation; the rod securing means being shown in an unlocked position;

FIG. 2 is a sectional view taken on the line 2—2 of FIG. 1;

FIG. 3 is a sectional view taken on the line 3—3 of FIG. 1;

FIG. 4 is an exploded perspective view of the improved locking device of the handle of this invention; and FIG. 5 is a fragmentary view of a portion of the handle of FIG. 1 showing the parts in a rod locking position.

Referring now to the drawings, in all of which like parts are designated by like reference characters, at 1 is shown a fishing rod handle preferably formed of a light weight metal, such as aluminum, or other preferred material, such as fibre glass, etc., including a tubular forwardly disposed portion 2 adapted to receive the butt end "R" of a fishing rod, a preferably intermediately disposed reel receiving portion 6, and a hand grip portion 10. The reel seat 6 in the form shown comprises a depressed portion 3 upon which the reel base 4 of a reel, generally indicated at 5, rests having an undercut portion forming a pocket 8 adapted to receive the toe of the reel base. The depressed reel seat portion 6 is provided at its rearward portion with upstanding slotted flanges 9—9. The hand grip portion 10 of the handle is preferably centrally bored for the reception of compression spring means 11 and the stem 12 of a clamp element 13. A cork covering 17 preferably encases the centrally bored grip portion 10 of the handle.

The clamp element 13 includes, in the modification shown, an enlarged head 14 transversely perforated for the reception of a pin 15 which is projected through the slotted portion of the flanges 9—9, and clamping nuts 16—16 threadedly engage the pin ends to prevent transverse movement. As the head 14 of the clamp element preferably is provided with forward reel engaging surfaces, upon release of the spring after placing the toe of the reel base in the undercut portion 8, the head rides forwardly over the heel of the base, as in the manner illustrated in U.S. Letters Patent to Kinnear, No. 2,102,237 and similarly to the construction shown in U.S. Letters Patent to Seidel, No. 2,289,216 wherefor the reel is securely mounted upon the reel seat portion of the handle. The reel positioning means shown forms no essential part of the present invention but is illustrative of the type of reel seat often used with handles with which the improved rod securing means of this invention is preferably associated.

The butt receiving portion 2 of the handle of this invention preferably comprises a generally tubular sleeve 35 adapted to be telescopically mounted over a longitudinally extending rod receiver 36 centrally bored at 37 and provided with a plurality of collet fingers 18 at its distal end and with spaced helical cam means 19 and 20 at its proximal or reel adjacent end. The sleeve 35 preferably comprises cam follower means 21 adapted to be projected through an opening 21' therein aligned with the cam race 22 in the rod receiver 16 into which the pin projects. The cam follower 21 is adapted to slidingly contact the said cam means 19 and 20 provided in the receiver 36 and is restricted or limited in its cammed helical movement by the said helical cam means in a clockwise or counterclockwise direction when attaching or detaching a rod from the said butt receiving portion of the handle.

As shown, the helical cam means 19 and 20, as best shown in FIGS. 1, 4 and 5, merge with the flat intermediately disposed helical race 22, and the opposite ends of the race are interrupted by a stop member 23 spanning the race and blocking the opposite ends thereof. The follower means 21 projects within the cam race or slot 22 as above described and contacts the oppositely disposed cam means 19 or 20, depending upon the direction or rotation of the sleeve member 35 for locking or unlocking the rod. The sleeve 35 is provided with inner surfaces corresponding in shape to the outer surfaces of the receiver 36 and is adapted to be longitudinally retracted and advanced according to the movement permitted by the spacing "X" provided between the tapered shoulder 25 of the receiver 36 and the tapered incline 26 of the sleeve 35.

When a preferred rod, indicated generally at "R" is inserted within the forward end of the sleeve and within the bore 37 of the receiver, the sleeve 35 is rotated by the operator in clockwise direction, as viewed in FIG. 3, and depending upon the dimension or circumference of the rod, the cam follower 21 will be stopped in a position about the helix determined by the amount of compression necessarily exerted by the collet fingers upon the rod which are cammed inwardly by the forwardly disposed tapered surfaces 30 of the sleeve mating with forwardly disposed tapered portions 31 of the collet fingers 18. A stop position is illustrated in FIG. 5.

The range of movement of the sleeve about the receiver is, therefore, limited by the size of the rod when said rod is inserted and by the web 23 when the bore or socket 17 is empty.

To detach the rod locked as aforesaid within the butt end of the handle, the sleeve 35 is rotated as shown in FIG. 3 in a counterclockwise direction to relieve the camming effect of the tapered surfaces 30 upon the tapered portion 31 of the fingers 18 and free the rod from its collet engagement therewith, and the cam follower 21 resumes its inclined position, as illustrated in FIG. 1.

The rod is, hence, according to this invention, quickly locked and detached from the fishing rod handle with but slight freely sliding, rotating movement of a loosely journalled sleeve over a rod receiver, said receiver being adapted to receive within certain limits, variant size rods.

While this invention is shown in connection with a preferred embodiment thereof, it is understood that numerous departures might be made therefrom without, however, departing from the spirit of the invention and the scope of the appended claims.

What is claimed is:

1. A device of the character described associated with a fishing rod handle and a fishing rod, said device comprising a rod receiver, said receiver being provided with a forwardly projecting, compressible end portion, first cam means disposed rearwardly thereof, a rotatable sleeve loosely telescoped over said receiver and compressing said end portion when moved in one longitudinal direction, second cam means carried by said rotatable sleeve engageable with said first cam means whereby upon rotation of said sleeve in one circumferential direction said sleeve is simultaneously moved forwardly in said longitudinal direction to secure the rod to the handle, and said sleeve upon rotation in an opposite circumferential direction releasing said compressible end portion and disassembling the rod and handle.

2. A device of the character described associated with a fishing rod handle and a fishing rod, said device comprising a rod receiver, said receiver being provided with a forwardly projecting, compressible end portion, first cam means disposed rearwardly thereof, a rotatable sleeve loosely telescoped over said receiver and compressing said end portion when moved in one longitudinal direction, second cam means carried by said rotatable sleeve engageable with said first cam means whereby upon rotation of said sleeve in one circumferential direction said sleeve is moved in a helical path into compressing engagement with said compressible means and whereby when said sleeve is rotated in the opposite circumferential direction said sleeve is moved in an opposite helical path out of compressive engagement with said compressible end portion thereby respectively securing and releasing said rod and handle relative to each other.

3. Attachment means for detachably mounting a rod to another member comprising a receiver concentrically bored to receive an end portion of said rod, said receiver being longitudinally slotted from one end thereof forming collet fingers around said rod, a rotatable sleeve telescoped over said receiver having tapered inner surfaces camming said fingers radially inwardly when said sleeve is moved in a first longitudinal direction and releasing said fingers allowing them to move outwardly when said sleeve is moved in the opposite longitudinal direction, said receiver having a helical cam slot at its outer periphery disposed within said sleeve, said sleeve having cam follower means projecting into said helical cam slot, rotation of said sleeve in opposite circumferential directions causing respectively different longitudinal movement of said sleeve by means of the interaction between said cam slot and said cam follower means.

4. A collet attachment means for detachably mounting a rod to another member comprising a hollow receiver having collet fingers, a rotatable sleeve telescoped over said receiver, cam means on said receiver, cam follower means on said sleeve coacting with said cam means, said cam means comprising a pair of longitudinally spaced, helical cams, said cam follower means disposed between said pair of cams whereby rotation of said sleeve in one circumferential direction cams said sleeve in one longitudinal direction and rotation of said sleeve in the opposite circumferential direction cams said sleeve in the opposite longitudinal direction, said longitudinal movements of said sleeve respectively radially compressing and releasing said collet fingers.

5. A fishing rod handle having attachment means at one end thereof for detachably mounting a fishing rod to said handle, said attachment means comprising a hollow receiver, a butt portion of a fishing rod disposed within said receiver, said receiver having circumferentially spaced collet fingers surrounding said butt portion, a rotatable sleeve telescoped over said receiver and coacting with said fingers, longitudinal movement of said sleeve in one direction compressing said fingers radially inwardly to grip said butt portion and movement of said sleeve in the opposite longitudinal direction releasing said fingers from gripping contact with said butt portion, the outer periphery of said receiver providing a recessed, longitudinally acting, helical cam race extending substantially around the circumference of said receiver, a stop member interrupting the opposite ends of said cam race, a cam follower pin projecting radially inwardly from said sleeve and slidably disposed within said race whereby longitudinal movement of said sleeve is effected by rotation of said sleeve.

6. In a collet attachment means, a cylindrical receiver element, said receiver element having a concentric bore therein open at one end of said element, the walls of said bore being radially slotted a substantial distance from the open end thereof to form a plurality of resilient collet fingers, the outer ends of said fingers being tapered, a sleeve rotatably telescoped over said receiver having inner tapered surfaces complementarily formed to the tapered surfaces of said fingers whereby movement of said sleeve in one longitudinal direction causes said fingers to be compressed radially inwardly, said receiver having a pair of longitudinally oppositely acting helical cams at the outer periphery of said receiver forming a helical cam race, a cam follower fixed to said sleeve and projecting radially into said cam race whereby rotation of said sleeve in either circumferential direction causes a corresponding movement of said sleeve in a longitudinal direction to either compress said fingers inwardly or to release said fingers and allow them to spring outwardly.

7. A collet attachment device as set forth in claim 6 wherein the said helical cam race encompasses said receiver by not more than a single turn.

8. A fishing rod handle having rod attachment means at one end thereof, a fishing rod detachably mounted to said handle by said attachment means, said attachment means comprising a centrally bored receiver secured to said handle, said rod positioned within said receiver, said receiver having integral collet fingers parallel with and surrounding said rod, a rotatable and longitudinally movable sleeve telescoped over said receiver, interfitting tapered surfaces on said collet fingers and said sleeve camming said collet fingers inwardly when said sleeve is moved longitudinally in the direction of said handle, said receiver having a pair of opposed, longitudinally interspaced, complementary helical cams extending around a portion of the circumference of said receiver, a cam follower mounted to said sleeve and projecting inwardly between said pair of cams, rotation of said sleeve in one circumferential direction causing longitudinal movement of said sleeve in the direction of said handle by the interaction of one of said cams and said cam follower, and rotation of said sleeve in the opposite circumferential direction causing longitudinal movement of said sleeve in the direction away from said handle by the interaction of the other of said cams and said cam follower, said receiver having a tapered shoulder disposed between said collet fingers and said cam portions of the receiver and said sleeve having a tapered incline spaced from said tapered shoulder, said spacing determining the extent of the longitudinal movement of said sleeve with respect to said receiver.

References Cited in the file of this patent

UNITED STATES PATENTS

| | | |
|---|---|---|
| 931,327 | Manzel | Aug. 17, 1909 |
| 1,187,497 | Canfield | June 20, 1916 |
| 1,808,051 | Masleski | June 2, 1931 |
| 2,702,192 | Warth | Feb. 15, 1955 |